United States Patent
Li et al.

(10) Patent No.: US 10,417,569 B2
(45) Date of Patent: Sep. 17, 2019

(54) DETECTING DEVIATIONS BETWEEN EVENT LOG AND PROCESS MODEL

(71) Applicant: International Business Machines Corporation, Armonk, NY (US)

(72) Inventors: Jing Li, Beijing (CN); Xiang Li, Beijing (CN); Haifeng Liu, Beijing (CN); Guo Tong Xie, Beijing (CN); Yi Qin Yu, Beijing (CN); Shi Lei Zhang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 379 days.

(21) Appl. No.: 14/598,655

(22) Filed: Jan. 16, 2015

(65) Prior Publication Data

US 2015/0213373 A1    Jul. 30, 2015

(30) Foreign Application Priority Data

Jan. 26, 2014  (CN) .......................... 2014 1 0038281

(51) Int. Cl.
G06F 9/44    (2006.01)
G06N 7/02    (2006.01)
G06N 7/00    (2006.01)

(52) U.S. Cl.
CPC .................................. *G06N 7/005* (2013.01)

(58) Field of Classification Search
None
See application file for complete search history.

(56) References Cited

U.S. PATENT DOCUMENTS 5,995,664 A    11/1999 Shimomura
6,275,801 B1    8/2001 Novak et al.
(Continued)

FOREIGN PATENT DOCUMENTS

CN    101739568 A    6/2010
CN    101872418 A    10/2010
(Continued)

OTHER PUBLICATIONS

Herbst et al. "Integrating Machine Learning and Workflow Management to Support Acquisition and Adaptation of Workflow Models", Database and Expert Systems, 1998, number of pp. 8.*
(Continued)

*Primary Examiner* — Li Wu Chang
(74) *Attorney, Agent, or Firm* — Cantor Colburn LLP; Grant Johnson

(57) ABSTRACT

A method for detecting deviations between an event log and a process model includes converting the process model into a probability process model, the probability process model comprising multiple nodes in multiple hierarchies and probability distribution associated with the multiple nodes, a leaf node among the multiple nodes corresponding to an activity in the process model; detecting differences between at least one event sequence contained in the event log and the probability process model according to a correspondence relationship; and identifying the differences as the deviations in response to the differences exceeding a predefined threshold; wherein the correspondence relationship describes a correspondence relationship between an event in one event sequence of the at least one event sequence and a leaf node in the probability process model.

7 Claims, 7 Drawing Sheets

(56) References Cited

U.S. PATENT DOCUMENTS

| | | | |
|---|---|---|---|
| 9,189,308 | B2 | 11/2015 | Young et al. |
| 2003/0117279 | A1 | 6/2003 | Ueno et al. |
| 2007/0011334 | A1 | 1/2007 | Higgins et al. |
| 2009/0018983 | A1 | 1/2009 | El-Rafei et al. |
| 2011/0145035 | A1 | 6/2011 | Franke et al. |
| 2012/0137367 | A1 | 5/2012 | Dupont et al. |
| 2012/0158360 | A1 | 6/2012 | Cammert et al. |
| 2013/0035976 | A1 | 2/2013 | Buffett |
| 2013/0110576 | A1 | 5/2013 | Roy et al. |
| 2014/0058789 | A1 | 2/2014 | Doehring et al. |
| 2014/0280353 | A1* | 9/2014 | Delaney ............ G06F 17/30734 707/794 |

FOREIGN PATENT DOCUMENTS

| | | |
|---|---|---|
| CN | 103189871 A | 7/2013 |
| CN | 103246884 A | 8/2013 |
| WO | 2008129442 A1 | 10/2008 |

OTHER PUBLICATIONS

Jing Li, et al.,"Detecting Deviations Between Event Log and Process Model," U.S. Appl. No. 14/748,837, filed Jun. 24, 2015.

Jing Li, et al.,"Detecting Deviations Between Event Log and Process Model," U.S. Appl. No. 14/748,850, filed Jun. 24, 2015.

Jing Li, et al.,"Detecting Deviations Between Event Log and Process Model," U.S. Appl. No. 14/748,867, filed Jun. 24, 2015.

List of IBM Patents or Patent Applications Treated as Related; CN920130175US1, Date Filed: Jan. 16, 2015, pp. 1-2.

M. De Leoni, et al., "Aligning Event Logs and Declarative Process Models for Conformance Checking," Business Process Management Lecture Notes in Computer Science, vol. 7481, 2012, pp. 82-97.

R. Bose, et al., "Trace Alignment in Process Mining: Opportunities for Process Diagnostics," Business Process Management Lecture Notes in Computer Science, vol. 6336, 2010, pp. 227-242.

R.M. Alireza, et al., "Chapter 1: Knowledge Extraction from Events Flows," Methodologies and Technologies for Networked Enterprises Lecture Notes in Computer Science, vol. 7200, 2012, pp. 1-18.

W.M.P. Van Der Aalst, "Business Alignment: Using Process Mining as a Tool for Delta Analysis and Conformance Testing," Original Article, Requirements Engineering, Nov. 2005, vol. 10, No. 3, p. 198-211.

CN First Office Action and English Translation; Application No. CN 201410038281.X; dated Mar. 31, 2017; 20 pages.

CN Supplementary Search Report; Application No. CN 201410038281X; dated Apr. 3, 2018, 1 page.

De Leoni et al.; "Aligning Event Logs and Process Models for Multi-Perspective Conformance Checking: An Approach Based on Integer Linear Programming"; Proceedings of the 11th International Conference on Business Process Management (BPM'13) 2013; 19 pages.

Rozinat et al.; "Conformance Checking of Processes Based on Monitoring Real Behavior"; Information Systems 33 (1), 6495 (2008); 44 pages.

Van Der Aalst et al.; "Process Mining and Verification of Properties: An Approach based on Temporal Logic"; Lecture Notes in Computer Science 3760, 130147 (2005); 18 pages.

Van Der Aalst et al.; "Replaying History on Process Models for Conformance Checking and Performance Analysis"; Wiley Inderdisciplinary Reviews: Data Mining and Knowledge Discovery 2(2); 182192 (2012); 18 pages.

Westergaard; "Better Algorithms for Analyzing and Enacting Declarative Workflow Languages Using LTL"; Proceedings of the 9th Business Process Manangement Conference (BPM'11); 2011; 16 pages.

* cited by examiner

500A
$c_1 = (\neg(h = [\text{phase 1, treatment 1}, T])\ U\ (h = [\text{phase 1, test 1, HbA1c}]))$
$\vee\ G(\neg(h = [\text{phase 1, treatment 1}, T]))$
$= (\neg B\ U\ A) \vee G(\neg B)$
Fig. 5A
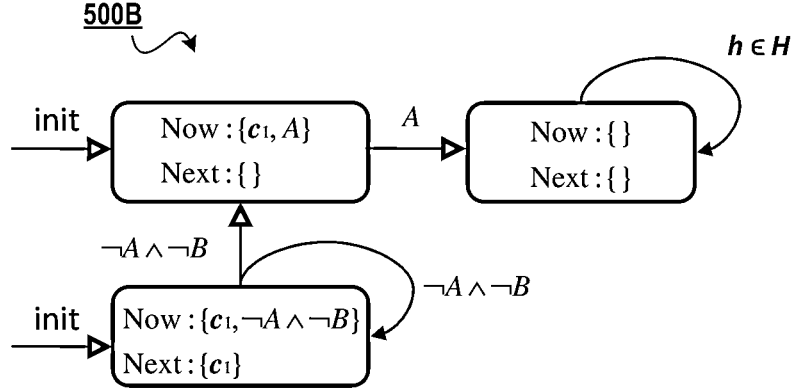
Fig. 5B
500C
$h \in H/\{[\text{phase 1, treatment 1}, T]\}$,
$[\text{phase 1, test 1, HbA1c}]$
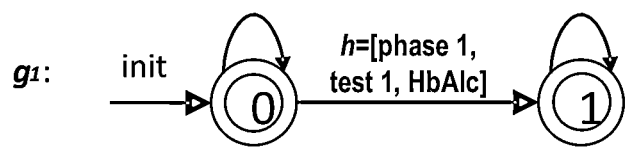
Fig. 5C

DETECTING DEVIATIONS BETWEEN EVENT LOG AND PROCESS MODEL

FOREIGN PRIORITY

This application claims priority to Chinese Patent Application No. 201410038281.X, filed Jan. 26, 2014, and all the benefits accruing therefrom under 35 U.S.C. §119, the contents of which in its entirety are herein incorporated by reference.

BACKGROUND

Various embodiments of the present invention relate to data processing, and more specifically, to a method and apparatus for detecting deviations between an event log and a process model.

With the development of computer hardware and software technology, computer aided systems are able to provide management and support for every aspect of people's life. For example, computer aided software has been witnessed in more and more areas like production management, office automation, etc. Customized criteria may exist in various areas. Technical solutions have been developed for describing the criteria by process models and, based on the process models, managing and controlling flows of transactions like production management. In these technical solutions, a relationship among various phases in a flow may be described using a process model, and it is monitored based on the process model whether each event sequence conforms to predefined process in the actual running procedure.

In the criteria there may further exist additional temporal constraints among phases, for example, phase 2 can be executed only if phase 1 has been executed in advance, etc. However, current solutions fail to check whether an event sequence in each event log satisfies temporal constraints among phases.

On the other hand, the same activities might be executed in different phases. Suppose during diabetes treatment, hemoglobin A1c (HbA1c) might be tested in different treatment phases. Existing solutions fail to distinguish to which phase an HbA1c test belongs, so error might occur when verifying whether or not an event sequence conforms to medical criteria. Therefore, it has become a focus of attention regarding how to detect deviations between an event log and a process model in a more accurate and effective manner.

SUMMARY

According to one aspect of the present invention, there is provided a method for detecting deviations between an event log and a process model, including converting the process model into a probability process model, the probability process model comprising multiple nodes in multiple hierarchies and probability distribution associated with the multiple nodes, a leaf node among the multiple nodes corresponding to an activity in the process model; detecting differences between at least one event sequence contained in the event log and the probability process model according to a correspondence relationship; and identifying the differences as the deviations in response to the differences exceeding a predefined threshold, wherein the correspondence relationship describes a correspondence relationship between an event in one event sequence of the at least one event sequence and a leaf node in the probability process model.

According to one aspect of the present invention, the detecting differences between at least one event sequence contained in the event log and the probability process model according to a correspondence relationship comprises: with respect to a current event sequence of the at least one event sequence, aligning each event in the current event sequence with the leaf node in the probability process model; recording a path of a leaf node with which each event is aligned in the probability process model so as to convert the current event sequence into a path sequence; and determining the differences based on the probability process model and the path sequence.

According to one aspect of the present invention, there is provided an apparatus for detecting deviations between an event log and a process model, comprising: a converting module configured to convert the process model into a probability process model, the probability process model comprising multiple nodes in multiple hierarchies and probability distribution associated with the multiple nodes, a leaf node among the multiple nodes corresponding to an activity in the process model; a detecting module configured to detect differences between at least one event sequence contained in the event log and the probability process model according to a correspondence relationship; and an identifying module configured to identify the differences as the deviations in response to the differences exceeding a predefined threshold, wherein the correspondence relationship describes a correspondence relationship between an event in one event sequence of the at least one event sequence and a leaf node in the probability process model.

According to one aspect of the present invention, the detecting module comprises: an aligning module configured to, with respect to a current event sequence of the at least one event sequence, align each event in the current event sequence with the leaf node in the probability process model; a path generating module configured to record a path of a leaf node with which each event is aligned in the probability process model so as to convert the current event sequence into a path sequence; and a determining module configured to determine the differences based on the probability process model and the path sequence.

According to one aspect of the present invention, there is provided a method for updating a process model, comprising: based on the above method, detecting deviations between an event log and the process model; and updating the process model based on the deviations.

According to one aspect of the present invention, there is provided an apparatus for updating a process model, comprising: an apparatus as described above, configured to detect deviations between an event log and the process model; and an updating module configured to update the process model based on the deviations.

By means of the methods and apparatuses of the present invention, deviations between an event log and a process model can be detected in a more accurate and effective manner while keeping the existing technical solution as much as possible. In addition, as time elapses, an outdated process model can be updated based on the detected deviations.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIGS. 5A, 5B, and 5C schematically show respective schematic views of procedures for constructing an automaton conforming to constraints in the probability process model according to one embodiment of the present invention;

DETAILED DESCRIPTION

Figure 1:
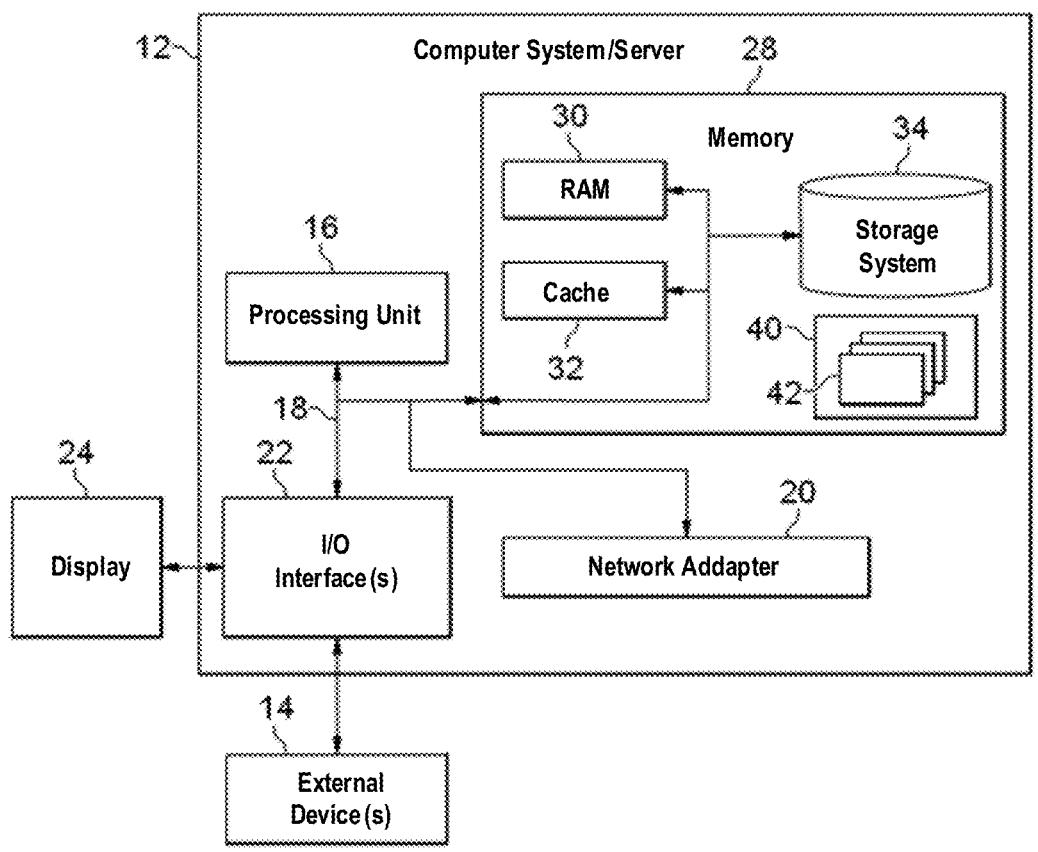
FIG. 1 shows an exemplary mobile device which is applicable to implement the embodiments of the present invention.

Exemplary embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, in which an exemplary mobile device 12 which is applicable to implement the embodiments of the present invention is shown. Mobile device 12 is only illustrative and is not intended to suggest any limitation as to the scope of use or functionality of embodiments of the invention described herein.

As shown in FIG. 1, mobile device 12 is shown in the form of a general-purpose computing device. The components of mobile device 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Mobile device 12 typically includes a variety of computer system readable media. Such media may be any available media that is accessible by mobile device 12, and it includes both volatile and non-volatile media, removable and non-removable media.

System memory 28 can include computer system readable media in the form of volatile memory, such as random access memory (RAM) 30 and/or cache memory 32. Mobile device 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Mobile device 12 may also communicate with one or more external devices 14 such as a keyboard, a pointing device, a display 24, etc.; one or more devices that enable a user to interact with mobile device 12; and/or any devices (e.g., network card, modem, etc.) that enable mobile device 12 to communicate with one or more other computing devices. Such communication can occur via Input/Output (I/O) interfaces 22. Still yet, mobile device 12 can communicate with one or more networks such as a local area network (LAN), a general wide area network (WAN), and/or a public network (e.g., the Internet) via network adapter 20. As depicted, network adapter 20 communicates with the other components of mobile device 12 via bus 18. It should be understood that although not shown, other hardware and/or software components could be used in conjunction with mobile device 12. Examples, include, but are not limited to: microcode, device drivers, redundant processing units, external disk drive arrays, RAID systems, tape drives, and data archival storage systems, etc.

In detailed description below, various phases and activities as involved in diabetes treatment are taken as a concrete example to describe details of a method and apparatus of the present invention. Those skilled in the art should understand the technical solution disclosed by the present invention is not limited to medical institutions but is applicable to various industries so as to detect deviations between an event log and a process model in a corresponding trade and further update the process model. Specifically, it may be detected whether each event in production process conforms to production criteria, each event in office automation process conforms to office criteria, etc.

Figure 2:
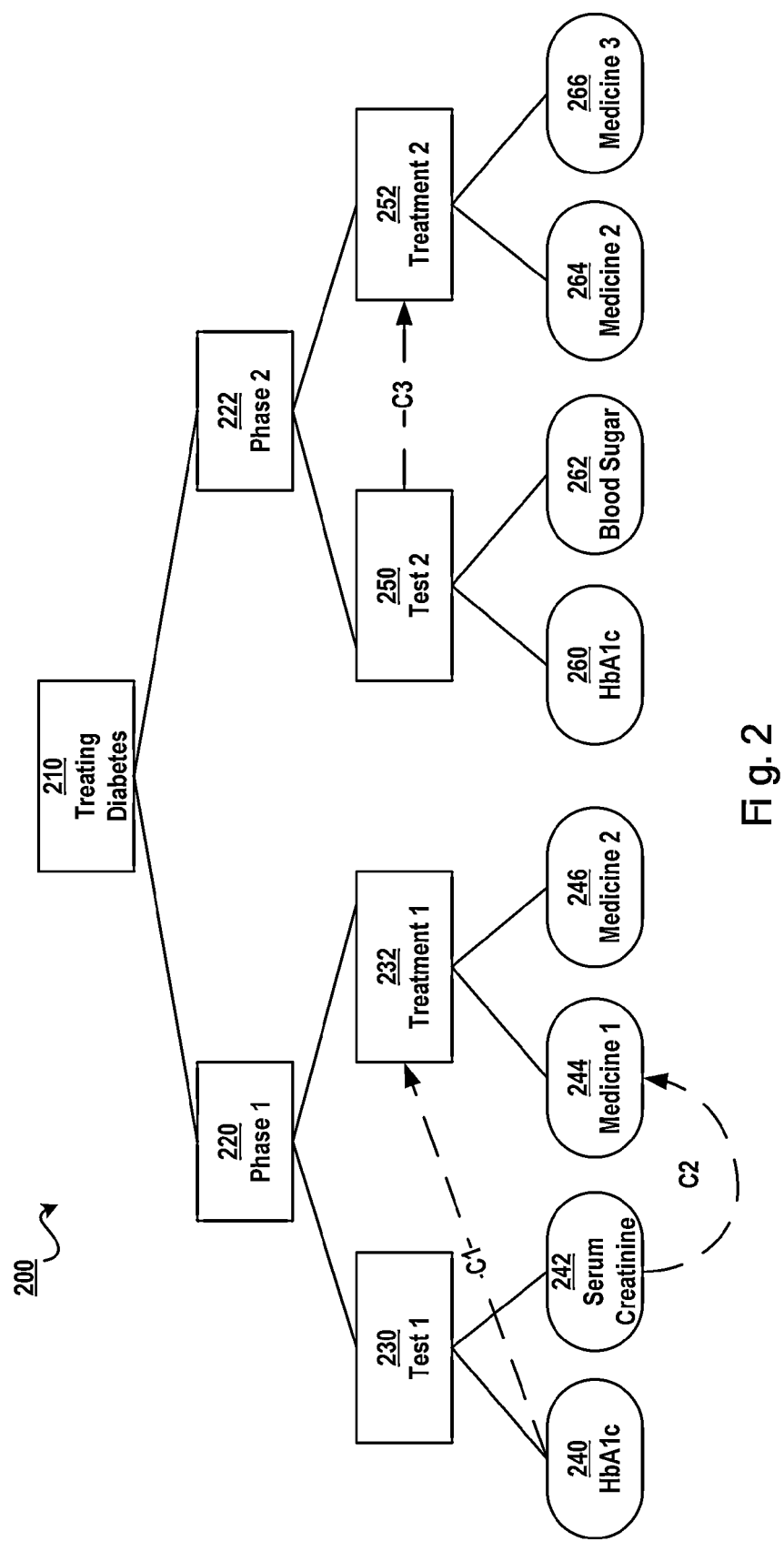
FIG. 2 schematically shows a block diagram of a process model.

FIG. 2 schematically shows a block diagram 200 of a process model. The solid-line portion in this figure shows a process model built based on medical criteria for diabetes treatment. In FIG. 2, various phases in the process are shown in rectangles, and activities are shown in ellipses. A root node 210 "treating diabetes" of the process model represents a root node of all operations during treatment, and the treatment process may be divided into two portions, namely a phase 1 220 and a phase 2 222.

In refined hierarchies, each phase may further comprise more detailed operations. For example, phase 1 220 may comprise a test 1 230 and a treatment 1 232. Test 1 230 may further comprise more test details, such as an activity 240 testing HbA1c and an activity 242 testing serum creatinine; treatment 1 232 may further comprise more details of the medicine, such as an activity 244 using medicine 1 and an activity 246 using medicine 2.

In a branch shown in phase 2 222, there are shown a test 2 250 and a treatment 2 252. Test 2 250 may further comprise more test details, such as an activity 260 for testing HbA1c and an activity 2 262 for testing blood sugar; treatment 2 252 may further comprise more medicine details, such as an activity 264 using medicine 2 and an activity 266 using medicine 3.

Note in the medical criteria there may further exist constraints. In the process model built based on the medical criteria, the constraints may be as shown by dotted arrows C1, C2 and C3 in FIG. 2, respectively. Detailed meaning of the constraints are shown as below:

C1: treatment 1 232 can occur only if HbA1c test 240 has occurred before;

C2: medicine 1 244 can be used only if serum creatinine test 242 has occurred before;

C3: treatment 2 252 can occur only if test 2 250 has occurred before.

Although a technical solution for deviation detection for a process model has already been proposed, the technical solution is not applicable to a process model having constraints as shown by C1 to C3 above. Those skilled in the art should note since most process models involve constraints, the existing technical solution for deviation detection for a process model is rather limited in terms of application scope.

In addition, as shown in FIG. 2, both phase 1 220 and phase 2 222 include a HbA1c test activity, but among activity nodes (HbAlc 240 and HbAlc 260) shown in ellipses in FIG. 2, it is impossible to distinguish, only according to the name of an activity, to which phase the activity belongs. Therefore, duplicated activity names might prevent an existing technical solution from normal running. In addition, when an event sequence is <HbAlc, medicine 1, medicine A, blood sugar, medicine 3, medicine 2>, "medicine A" occurs in this sequence but is not recorded in the process model. Such abnormal situation cannot be detected by solutions in the prior art. Therefore, there is a further need to improve drawbacks in the prior art.

To this end, the embodiments of the present invention provide a technical solution for detecting deviations between an event log and a process model based on a probability process model. Specifically, in one embodiment of the present invention, there is provided a method for detecting deviations between an event log and a process model, comprising: converting the process model into a probability process model, the probability process model comprising multiple nodes in multiple hierarchies and probability distribution associated with the multiple nodes, a leaf node among the multiple nodes corresponding to an activity in the process model; detecting differences between at least one event sequence contained in the event log and the probability process model according to a correspondence relationship; and in response to the difference exceeding a predefined threshold, identifying the differences as the deviations, wherein the correspondence relationship describes a correspondence relationship between an event in one event sequence of the at least one event sequence and a leaf node in the probability process model. By means of the technical solution of the present invention, it is possible handle duplicated activities and additional constraints in the process model.

Figure 3:
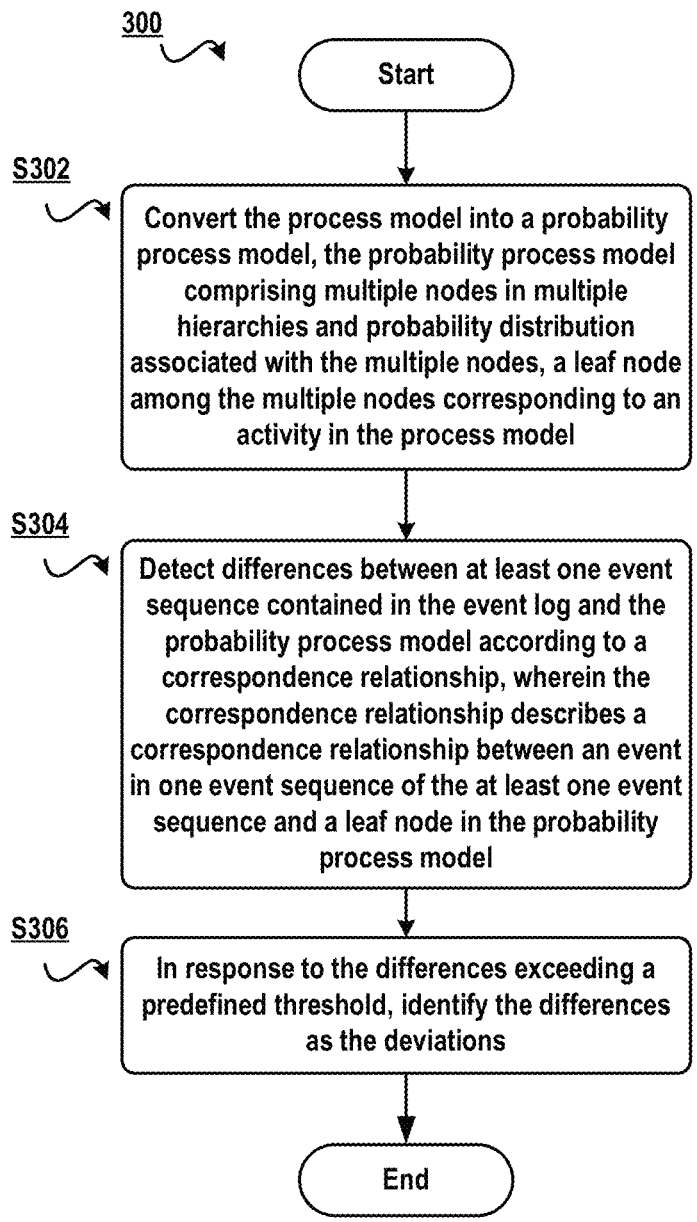
FIG. 3 schematically shows a flowchart of a method for detecting deviations between an event log and a process model according to one embodiment of the present invention.

FIG. 3 schematically shows a flowchart 300 of a method for detecting deviations between an event log and a process model according to one embodiment of the present invention.

In block S302, the process model is converted into a probability process model, the probability process model comprising multiple nodes in the multiple hierarchies and probability distribution associated with the multiple nodes, leaf nodes in the multiple nodes corresponding to activities in the process model. In this embodiment, there is proposed a probability process model, which may comprise multiple hierarchies; and in this embodiment, the location of a leaf node may be uniquely determined by the leaf node's path in the multiple hierarchies in the probability process model. In this manner, duplicated activities can be distinguished. For example, two test activities may be represented as [phase 1, test 1, HbAlc] and [phase 2, test 2, HbAlc], respectively.

In block S304, a difference between at least one event sequence contained in the event log and the probability process model is detected according to a correspondence relationship, wherein the correspondence relationship describes a correspondence relationship between an event in one event sequence of the at least one event sequence and a leaf node in the probability process model. According to various embodiments of the present invention, there exists a correspondence relationship between an event and an activity. Specifically, it may be considered an event is an instantiated activity and the event has all attributes of the activity. Specifically, it may be considered the event "HbAlc" in the event sequence is an instance of the activity HbAlc.

In this embodiment, a difference between the event sequence and the probability process model may be looked for. Since a probability process model has been built in a hierarchical manner and leaf nodes in the probability process model represent activities, differences can be found by comparing whether an event in the event sequence sequentially corresponds to an activity represented by a leaf node in the probability process model.

In block S306, in response to the differences exceeding a predefined threshold, the differences are identified as the deviations. Since the event log usually comprises a larger number of event sequences, if differences exist between only a small number of event sequences and the probability process model, it should not be considered that the event log has differences with the process model; instead, only when there are more than a certain number of differences, the differences are identified as the deviations.

Figure 4:
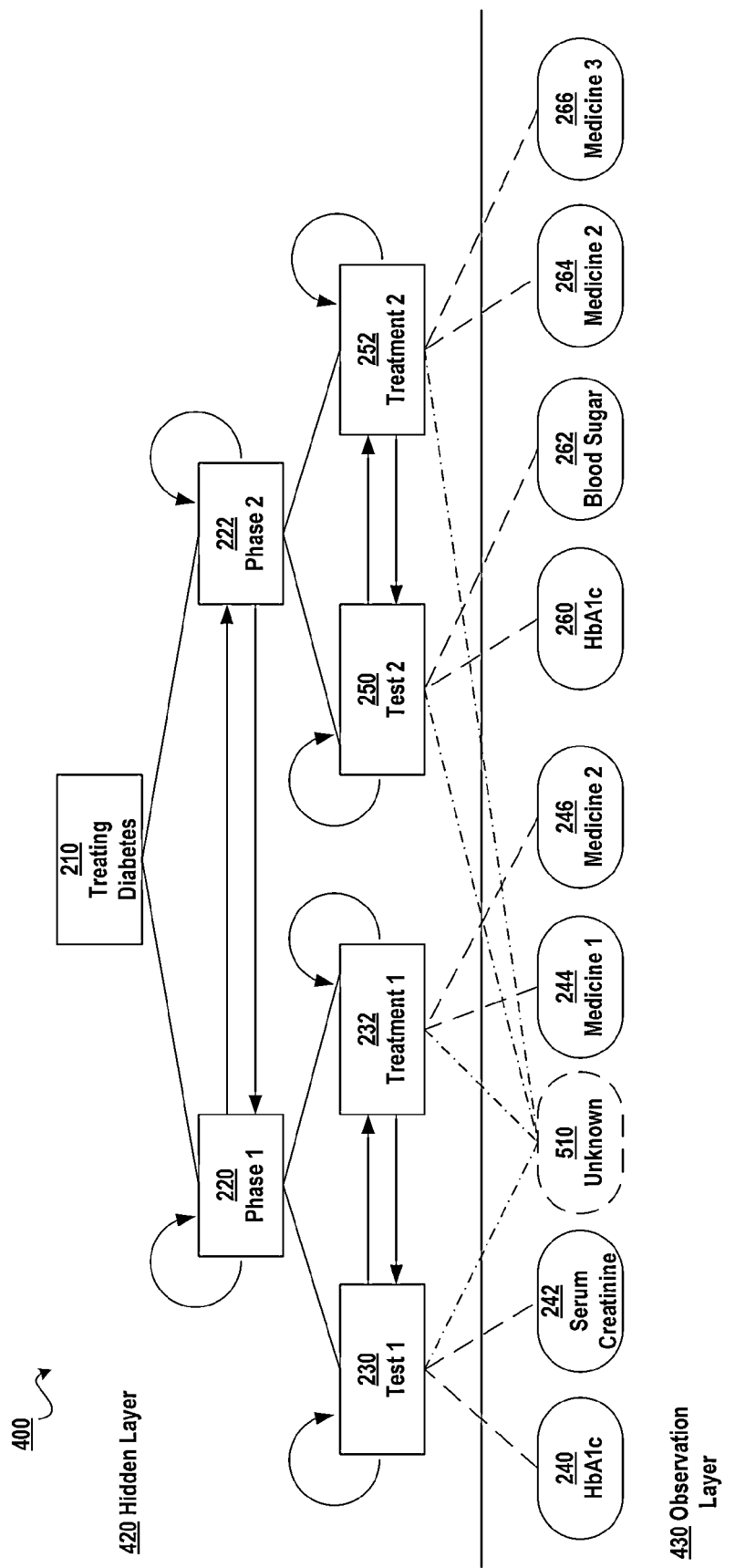
FIG. 4 schematically shows a block diagram of a probability process model according to one embodiment of the present invention.

FIG. 4 schematically shows a block diagram 400 of a probability process model according to one embodiment of the present invention. The probability process model may be constructed based on the original process model and may comprise two portions, namely a hidden layer 420 and an observation layer 430, wherein nodes (non-leaf nodes) in hidden layer 420 correspond to phases in the process model and nodes (leaf nodes) in observation layer 430 correspond to activities in the process model.

According to the embodiments of the present invention, since the event sequence might include an event corresponding to an activity that does not exist in the process model, an "unknown" node may be added to leaf nodes in the probability process model, so as to correspond to a new event that might occur in the event sequence (such as the above new medicine, namely medicine A).

In one embodiment of the present invention, a non-leaf node among the multiple nodes corresponds to a phase in the process model. As described above, the probability process model may be constructed in a hierarchical manner, so that non-leaf nodes and nodes in the probability process model respectively correspond to phases and activities in the process model.

In one embodiment of the present invention, the probability process model may be constructed based on a hierarchical hidden Markov model (HHMM). Detailed description of HHMM is omitted here.

Detailed description is presented below to how to calculate probability distribution in the probability process model. In one embodiment of the present invention, the converting the process model into a probability process model comprises: calculating start probabilities of occurrence of the non-leaf nodes, transition probabilities among the non-leaf nodes and emission probabilities from the non-leaf nodes to the leaf nodes, so as to form the probability process model.

In the embodiments of the present invention, since a comparison needs to be made between the event sequence and various leaf nodes in the probability process model, first probability distribution associated with various nodes in the probability process model needs to be determined, and then a probability that an activity is performed during diabetes treatment is determined.

Specifically, the probability distribution may comprise start probabilities of occurrence of the non-leaf nodes, transition probabilities among the non-leaf nodes and emission probabilities from the non-leaf nodes to the leaf nodes. In this embodiment, the start probability $P_S(Y|X)$ may refer to a probability that state Y occurs in state X. For example, since treating diabetes 210 is a root node in the probability process model, a probability of a phase represented by this node may be set as 1. After diabetes treatment is started, phase 1 220 and phase 2 222 may be executed, so a probability that phase 2 220 occurs in the state of treating diabetes 210 and a probability that phase 2 222 occurs in the state of treating diabetes 210 may be set. According to the above principle, those skilled in the art may further calculate a probability that test 1 230 occurs in the state of phase 1 220, etc.

In this embodiment, the transition probability $P_T(Y|X)$ may represent a probability that state Y occurs in state X. For example, transition is possible between phase 1 220 and 2 222, between test 1 230 and treatment 1 232, and between test 2 250 and treatment 2 252, etc. In addition, those skilled in the art should understand that X and Y may represent the same state, i.e., X state may transition to itself. For example, test 1 230 may transition to itself.

In this embodiment, the emission probability $P_E(O|X)$ may represent a probability that activity O occurs in state X in the hidden layer. For example, as shown in FIG. 4, a probability that test activity HbA1c 240 is executed in the state of test 1 230 is the emission probability.

In this embodiment, when calculating the probability of HbA1c 240 occurrences, a product of all probabilities corresponding to paths between this leaf node and the root node in the probability process model may be solved and used as probability distribution of HbA1c 240 occurrences. Specifically, suppose the probability of treating diabetes 210-phase 1 220 is 0.5, the probability of phase 1 220-test 1 230 is 0.5 and the probability of test 1 230-HbA1c 240 is 0.3, then the probability of HbA1c 240 occurrences=1×0.5×0.5×0.3=0.075. Note the above example simply takes into consideration the most simple situation of the first event in the event sequence, and transition probabilities should further be considered for other events in the event sequence. Those skilled in the art may implement a concrete calculation based on the principle of probability distribution, which is not detailed here.

Those skilled in the art may further use the above principle to calculate probability distribution of occurrences of an activity represented by other leaf node and then form the probability process model.

In one embodiment of the present invention, the calculating start probabilities of occurrence of the non-leaf nodes, transition probabilities among the non-leaf nodes and emission probabilities from the non-leaf nodes to the leaf nodes, so as to form the probability process model comprises: setting at least one of the start probabilities, the transition probabilities and the emission probabilities to form the probability process model; and iteratively training the probability process model.

Since concrete values of various probabilities were not learned initially, data may be set using uniform distribution, i.e., the start probabilities may be set based on empirical data for the past process or based on other approach. For example, both probabilities of treating diabetes 210-phase 1 220 and treating diabetes 210-phase 2 222 may be set as 0.5, representing equal probabilities of occurrences. Next, training may be iteratively conducted using various training algorithms and based on collected historical data, so as to obtain optimized probability distribution. In one embodiment of the present invention, the training may be conducted using the Baum-Welch algorithm; alternatively, those skilled in the art may use other algorithms for the training.

Since the training process takes into consideration historical data about executing each phase during diabetes treatment, probability distribution resulting from the training usually differs from uniform distribution and can reflect the true situation of treatment more accurately. For example, through training, the start probability of treating diabetes 210-phase 1 220 may change to 0.4, while the start probability of treating diabetes 210-phase 2 222 may change to 0.6, and subsequent processing is performed based on the values 0.4 and 0.6.

In one embodiment of the present invention, the detecting differences between at least one event sequence contained in the event log and the probability process model according to a correspondence relationship comprises: with respect to a current event sequence of the at least one event sequence, aligning each event in the current event sequence with the leaf node in the probability process model based on the probability distribution; recording a path of a leaf node with which each event is aligned in the probability process model so as to convert the current event sequence into a path sequence; and determining the differences based on the probability process model and the path sequence.

Since the event log comprises multiple event sequences, these event sequences in the event log may be compared with the probability process model one by one. Specifically, with respect to a current event sequence among the multiple event sequences, first events in the current event sequence may be aligned with leaf nodes in the probability process model. In the context of the present invention, since the leaf nodes contain duplicated activities, various alignment approaches might exist. For example, suppose the first event in the current event sequence is "HbA1c", when aligning the current event sequence with the probability process model as shown in FIG. 4, the event might be aligned with activity HbA1c 240 or activity HbA1c 260. At this point, it is necessary to resort to probability distribution in the probability process model for aligning the event with an activity having a higher probability. Specifically, suppose the probability of activity HbA1c 240 is 0.1 while the probability of activity HbA1c 260 is 0.05, then the event may be aligned with activity HbA1c 240.

Note the alignment of one event with one activity has been taken as a concrete example to illustrate how to perform alignment above. Those skilled in the art should understand when aligning multiple events in the event sequence with multiple activities represented by leaf nodes in the probability process model, an alignment approach as below may be selected: the alignment approach may maximize a product of occurrence probabilities of activities aligned with each event in the event sequence.

In one event sequence, except that the first event only considers the start probability, the transition probability from the previous event should further considered when calculating a probability that each other event is aligned with an activity. In other words, from the 2nd event, a probability of each event is related to the previous event (i.e., a probability of the 2nd event depends on the 1st event, and so on and so forth).

Detailed illustration is presented below to how to align an event with a leaf node in the probability model. Suppose the current event sequence is <HbA1c, medicine 2>, and occurrences probabilities of activities are as shown in Table 1 below:

TABLE 1

Probability Distribution current activity| previous activity

| | HbA1c 240 \| null | HbA1c 260 \| null | medicine 2 246 \| HbA1c 240 | medicine 2 264 \| HbA1c 240 | medicine 2 246 \| HbA1c 260 | medicine 2 264 \| HbA1c 260 | ... |
|---|---|---|---|---|---|---|---|
| probability | 0.1 | 0.05 | 0.05 | 0.01 | 0.01 | 0.05 | ... |

Therefore, probabilities of aligning the event sequence <HbA1c, medicine 2> with the following activities are:

1) probability of alignment with (HbA1c 240, medicine 2 246)=0.1*0.05=0.005;

2) probability of alignment with (HbA1c 240, medicine 2 264)=0.1*0.01=0.001;

3) probability of alignment with (HbA1c 260, medicine 2 246)=0.05*0.01=0.0005;

4) probability of alignment with (HbA1c 260, medicine 2 264)=0.05*0.05=0.0025.

When selecting a maximum probability from the above probabilities, the current event sequence may be aligned with the activity (HbA1c 240, medicine 2 246).

Note above Table 1 merely schematically shows one example of a data structure for saving probability distribution, and those skilled in the art may further use other modes to store probability distribution. In addition, Table 1 merely illustrates one part of data of probability distribution in the probability process model, and the model may further comprise probability distribution associated with other nodes.

Next, a path of a leaf node aligned with each event in the probability process model is recorded, so as to convert the current event sequence into a path sequence. Continuing the above example, a path for HbA1c is: [phase 1, test 1, HbA1c]; a path for medicine 2 is: [phase 1, treatment 1, medicine 2]. And a path sequence may be represented as: <[phase 1, test 1, HbA1c], [phase 1, treatment 1, medicine 2]>. The event sequence comprising two events only has been taken as an example to illustrate how to obtain path sequence above, and those skilled in the art may construct a corresponding path sequence for an event sequence comprising more events, based on the above principle.

For example, suppose there exists another event sequence: <HbA1c, medicine 1, medicine A, blood sugar, medicine 3, medicine 2>, then a corresponding path sequence may be represented as: <[phase 1, test 1, HbA1c], [phase 1, treatment 1, medicine 1], [phase 1, treatment 1, Unknown], [phase 2, test 2 blood sugar], [phase 2, treatment 2, medicine 3], [phase 2, treatment 2, medicine 2]>.

In a subsequent operation, differences may be determined based on the probability process model and the path sequence. Note since the probability process model is introduced into the technical solution of the present invention, the path comprises a multi-level path corresponding to multiple hierarchies in the probability process model. Specifically, in the above example, there is a three-level path, such as [phase 1, test 1, HbA1c]. If the probability process model comprises more hierarchies, then the path also comprises more hierarchies.

In one embodiment of the present invention, types of the differences comprise at least one of: additional activities, absent activities and violated constraints. In the context of the present invention, the additional activity refers to an activity that is not included in the original process model but whose instantiated event occurs in the event log, such as the above new medicine (medicine A). The absent activity refers to an activity that is included in the original process model but whose instantiated event does not occur in the event log. The violated constraint represents violation of a constraint among various nodes in the process model, such as violation of the above constraint C1.

Illustration is presented below to how to determine the differences based on the probability process model and the path sequence, based on concrete types of the differences.

In one embodiment of the present invention, types of the differences comprise violated constraints, and the determining the differences based on the probability process model and the path sequence comprises: using linear temporal logic (LTL) to construct an automaton conforming to constraints in the probability process model; and obtaining the violated constraints from a path sequence that cannot be accepted by the automaton.

A corresponding automaton may be constructed using linear temporal logic with respect to constraints to be satisfied among various nodes in the probability process model. With reference to FIGS. 5A to 5C, detailed description is presented below to the process of constructing an automaton with respect to the above constraint C1. Specifically, FIGS. 5A to 5C show schematic views 500A to 500C of the process of constructing an automaton conforming to constraints in the probability process model according to one embodiment of the present invention.

With reference to FIG. 5A, the constraint C1 may be represented as:

$$c_1 = (\neg(h=[\text{phase1,treatment1},T]))U(h=[\text{phase1,test1,HbA1c}])\vee G(\neg(h=[\text{phase1,treatment1},T]))$$

When h=[phase 1, treatment 1, T] is represented using a character B, and h=[phase 1, test 1, HbA1c] is represented using a character A, the above equation may be simplified as $(\neg B\ U\ A)\neg G(\vee B)$.

Next, with respect to the constraint C1, the above LTL equation may be converted into a non-deterministic finite automaton (NFA); subsequently, the automaton may be converted into an automaton-based constraint checker (as shown in FIGS. 5B to 5C).

Afterwards, the constraint checker is run with respect to each event sequence in the event log, and then an event sequence that is not accepted by the checker is an event sequence of violated constraints. Although only an example of how to construct a checker based on the constraint C1 has been shown above, those skilled in the art may construct a corresponding checker with respect to other constraint (e.g., constraints C2 and C3) based on the above principle. Regarding the linear temporal logic and how to construct a non-deterministic finite automaton based on the linear temporal logic, those skilled in the art may make reference to description of a related algorithm, which is not detailed here.

Figure 6A:
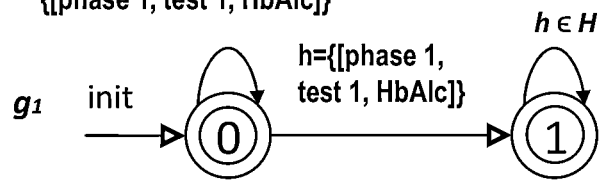
FIGS. 6A, 6B and 6C schematically show respective schematic views of using an automaton to detect whether an event sequence conforms to constraints according to one embodiment of the present invention.
Figure 6B:
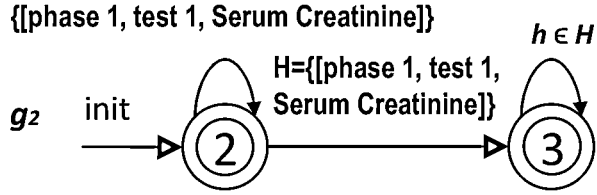
Figure 6C:
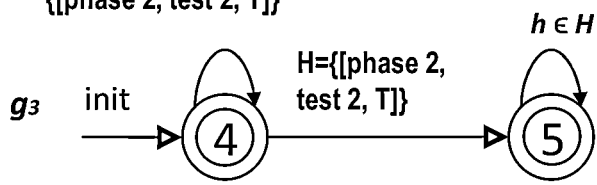

FIGS. 6A to 6C show schematic views 600A to 600C of checking whether an event sequence conforms to a constraint by using an automaton according to one embodiment of the present invention. The automatons as shown in FIGS. 6A to 6C may be applied to each event sequence in the event log, so as to obtain all event sequences violating the constraints C1 to C3.

In one embodiment of the present invention, types of the differences comprise absent activities, and the determining the differences based on the probability process model and the path sequence comprises: calculating a universal set $S_{Model}$ of paths of the leaf nodes in the probability process model, and a universal set $S_{Log}$ of a path, of a leaf node aligned with an event in an event sequence of the at least one event sequence, in the probability process model, respectively; calculating a difference set $S_{Absent}=S_{Model}-S_{Log}$ between the universal set $S_{Model}$ and the universal set $S_{Log}$ as absent activities.

Those skilled in the art may understand if in the process model there exists a specific activity but this activity has never been instantiated in actual operation process or only a very few instantiated events exist, then it may be considered: whether the process model is correctly set, and whether the absent activity should be removed from the process model. Specifically, continuing the above example of diabetes treatment, suppose a current medical criteria was formulated years ago and a process model built based on the medical criteria includes medicine B, whereas with the improvement in healthcare, medicine B is gradually replaced by medicine C, then at this point the activity of treatment using medicine B becomes an absent activity.

Before looking for absent activities, it is necessary to calculate a universal set $S_{Model}$ of paths of the leaf nodes in the probability process model, and a universal set $S_{Log}$ of a path of a leaf node aligned with an event in an event sequence of the at least one event sequence in the probability process model, respectively.

Returning to FIG. 4, suppose a universal set $S_{Model}$ of paths of the leaf nodes in the probability process model=< [phase 1, test 1, HbAlc], [phase 1, treatment 1, medicine 1], . . . > and a universal set $S_{Log}$ of a path associated with each event in the event log=<[phase 1, test 1, HbAlc], [phase 1, treatment 1, medicine A], . . . > (excluding [phase 1, treatment 1, medicine 1]), then a difference set $S_{Absent}=S_{Model}-S_{Log}=$[phase 1, treatment 1, medicine 1] between the universal set $S_{Model}$ and the universal set $S_{Log}$. In this example, [phase 1, treatment 1, medicine 1] is an absent activity.

In one embodiment of the present invention, types of the differences comprise additional activities, and the determining the differences based on the probability process model and the path sequence comprises: calculating a universal set $S_{Model}$ of paths of the leaf nodes in the probability process model, and a universal set $S_{Log}$ of a path of a leaf node aligned with an event in an event sequence of the at least one event sequence in the probability process model; calculating a difference set $S_{Additional}=S_{Log}-S_{Model}$ between the universal set $S_{Log}$ and the universal set $S_{Model}$ as additional activities.

Those skilled in the art may understand if there exists a large number of new events in the event log but no corresponding activities exist in the process model, then it may be considered whether the process model is correctly set and whether corresponding new activities should be added to the process model. Specifically, continuing the above example of diabetes treatment, suppose a current medical criteria was formulated years ago and with the improvement in healthcare, newly developed medicine A has gradually become a dominant medicine, then the activity of treatment using medicine A becomes an additional activity.

Continuing the above example, suppose the universal set $S_{Model}$ does not include [phase 1, treatment 1, medicine A] while the universal set $S_{Log}$ includes [phase 1, treatment 1, medicine A], then [phase 1, treatment 1, medicine A] is an additional activity.

Based on the above principle, those skilled in the art may obtain various types of differences, namely additional activities, absent activities and violated constraints. Note the differences between the event sequence and the probability process model may comprise one or more of the above types, for example, may only comprise violated constraints, or may comprise additional activities and absent activities, or may further comprise the differences of all the three types, etc.

In one embodiment of the present invention, the identifying the differences as the deviations in response to the differences exceeding a predefined threshold comprises: calculating a ratio of the number of event sequences with differences of the at least one event sequence to the total number of the at least one event sequence; and in response to the ratio exceeding a predefined ratio, identifying differences of the type as the deviations.

Note the deviations mentioned in the context of the present invention refer to that differences accumulate to a given extent and lead to significant departures between an actual flow in practice and the original process model; however, slight departures (for example, new medicine A is used in treatment for only several patients) should not be referred to as deviations. Therefore, whether there exist deviations may be judged based on the ratio of the number of event sequences with differences to the total number.

As described above, since the differences may comprise multiple types, the ratio may be calculated with respect to each type among the multiple types. Specifically, suppose the event log contains treatment records of 1000 patients, wherein new medicine A is used for only 15 patients, so a ratio of "additional activity" occurrence is 1.5%. If a threshold for "additional activities" is 10%, then it is not considered that there exist deviations. In another case, if new medicine A is used for 500 patients, then 500/1000>10%, at which point there are deviations.

With respect to differences of "absent activities" and "violated constraints" types, those skilled in the art may set corresponding thresholds based on the above principle, which is not detailed here.

In one embodiment of the present invention, there is provided a method for updating a process model, comprising: based on the above method, detecting deviations between an event log and the process model; and updating the process model based on the deviations.

Detailed illustration has been presented above to how to detect deviations between an event log and the process model with reference to the accompanying drawings, and then updating the process model based on the deviations may be considered after detecting the deviations. Specifically, for example, it is found that new medicine A is used frequently for diabetes treatment, then the new medicine A may be added to the process model; for another example, when it is found no doctor uses medicine 1 during treatment, then medicine 1 may be removed from the process model. Corresponding medical criteria may be modified based on the process model.

Figure 7:
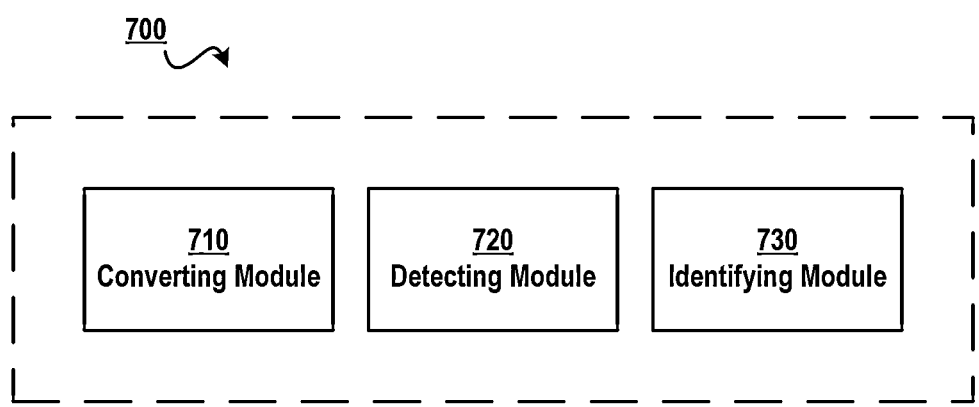
FIG. 7 schematically shows a block diagram of an apparatus for detecting deviations between an event log and a process model.

FIG. 7 schematically shows a block diagram of an apparatus for detecting deviations between an event log and a process model. As shown in FIG. 7, there is provided an apparatus for detecting deviations between an event log and a process model, comprising: a converting module 710 configured to convert the process model into a probability process model, the probability process model comprising multiple nodes in multiple hierarchies and probability distribution associated with the multiple nodes, a leaf node among the multiple nodes corresponding to an activity in the process model; a detecting module 720 configured to detect differences between at least one event sequence contained in the event log and the probability process model according to a correspondence relationship; and an identifying module 730 configured to identify the differences as the deviations in response to the differences exceeding a predefined threshold, wherein the correspondence relationship describes a correspondence relationship between an event in one event sequence of the at least one event sequence and a leaf node in the probability process model.

In one embodiment of the present invention, a non-leaf node among the multiple nodes corresponds to a phase in the process model.

In one embodiment of the present invention, converting module 710 comprises: a forming module configured to calculate start probabilities of occurrence of the non-leaf nodes, transition probabilities among the non-leaf nodes and emission probabilities from the non-leaf nodes to the leaf nodes, so as to form the probability process model.

In one embodiment of the present invention, the forming module comprises: a first forming module configured to set the start probabilities, the transition probabilities and the emission probabilities to form the probability process model; and a second forming module configured to iteratively train the probability process model.

In one embodiment of the present invention, detecting module 720 comprises: an aligning module configured to, with respect to a current event sequence of the at least one event sequence, align each event in the current event sequence with the leaf node in the probability process model; a path generating module configured to record a path of a leaf node with which each event is aligned in the probability process model so as to convert the current event sequence into a path sequence; and a determining module configured to determine the differences based on the probability process model and the path sequence.

In one embodiment of the present invention, the path comprises a multi-level path corresponding to multiple hierarchies in the probability process model.

In one embodiment of the present invention, types of the differences comprise at least one of: additional activities, absent activities and violated constraints.

In one embodiment of the present invention, the determining module comprises: a constructing module configured to use linear temporal logic to construct an automaton conforming to constraints in the probability process model; and an obtaining module configured to obtain the violated constraints from a path sequence that cannot be accepted by the automaton.

In one embodiment of the present invention, the determining module comprises: a calculating module configured to calculate a universal set $S_{Model}$ of paths of the leaf nodes in the probability process model, and a universal set $S_{Log}$ of a path, of a leaf node aligned with an event in an event sequence of the at least one event sequence, in the probability process model, respectively; an absent activities obtaining module configured to calculate a difference set $S_{Absent}=S_{Model}-S_{Log}$ between the universal set $S_{Model}$ and the universal set $S_{Log}$ as absent activities.

In one embodiment of the present invention, the determining module comprises: a calculating module configured to calculate a universal set $S_{Model}$ of paths of the leaf nodes in the probability process model, and a universal set $S_{log}$ of a path, of a leaf node aligned with an event in an event sequence of the at least one event sequence, in the probability process model, respectively; an additional activities obtaining module configured to calculate a difference set $S_{Additional}=S_{Log}-S_{Model}$ between the universal set $S_{Log}$ and the universal set $S_{Model}$ as additional activities.

In one embodiment of the present invention, identifying module 730 comprises: a ratio calculating module configured to calculate a ratio of the number of event sequences with differences of the at least one event sequence to the total number of the at least one event sequence; and a deviation identifying module configured to, in response to the ratio exceeding a predefined ratio, identify differences of the type as the deviations.

In one embodiment of the present invention, there is provided an apparatus for updating a process model, comprising: an apparatus as described above, configured to detect deviations between an event log and the process model; and an updating module configured to update the process model based on the deviations.

By means of the methods and apparatuses of the present invention, deviations between an event log and a process model can be detected in a more accurate and effective manner while keeping the existing technical solution as much as possible. In addition, as time elapses, an outdated process model can be updated based on the detected deviations.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. An apparatus for verifying conformance of a medical event sequence of a medical event log conforms to medical criteria by detecting deviations between the medical event log and a medical process model and modifying the medical process model based on the detected deviations, wherein the detecting includes constructing an automaton conforming to constraints of a converted model, wherein the medical event log and medical process model are received by the apparatus from a computer, the apparatus comprising:
- a processor operatively coupled to a memory;
- a converting module configured to convert the medical process model into a probability process model, the probability process model comprising multiple nodes in multiple hierarchies and probability distribution associated with the multiple nodes, a leaf node among the multiple nodes corresponding to a medical activity in the process model;
- a detecting module configured to detect differences between at least one medical event sequence contained in the medical event log and the probability process model according to a correspondence relationship; and
- an identifying module configured to, in response to the differences exceeding a predefined threshold, identify the differences as the deviations;
- wherein the correspondence relationship describes a correspondence relationship between a medical event in one medical event sequence of the at least one medical event sequence and a leaf node in the probability process model;
- wherein the identifying module comprises:
  - a ratio calculating module configured to calculate a ratio of the number of medical event sequences with differences of the at least one medical event sequence to the total number of the at least one medical event sequence; and
  - a deviation identifying module configured to, in response to the ratio exceeding a predefined ratio, identify differences of the type as the deviations;
- wherein the detecting module comprises:
  - an aligning module configured to, with respect to a current medical event sequence of the at least one medical event sequence, align each medical event in the current medical event sequence with the leaf node in the probability process model based on the probability distribution;
  - a path generating module configured to record a path, of a leaf node with which each medical event is aligned, in the probability process model so as to convert the current medical event sequence into a path sequence;
  - a determining module configured to determine the differences based on the probability process model and the path sequence, wherein types of the differences comprise violated constraints;
- wherein the determining module comprises:
  - a constructing module configured to use linear temporal logic to construct an automaton conforming to constraints in the probability process model; and
  - an obtaining module configured to obtain the violated constraints from a path sequence that cannot be accepted by the automaton; and
- an updating module configured to update the medical process model based on the deviations by modifying the medical process model to add the medical event sequence to the medical process model when the medical event sequence is found as the deviation.

2. The apparatus according to claim 1, wherein a non-leaf node among the multiple nodes corresponds to a phase in the medical process model.

3. The apparatus according to claim 2, wherein the converting module comprises:
- a forming module configured to calculate start probabilities of occurrence of the non-leaf nodes, transition probabilities among the non-leaf nodes and emission probabilities from the non-leaf nodes to the leaf nodes, so as to form the probability process model.

4. The apparatus according to claim 3, wherein the forming module comprises:
- a first forming module configured to set the start probabilities, the transition probabilities and the emission probabilities to form the probability process model; and
- a second forming module configured to iteratively train the probability process model based on collected historical data.

5. The apparatus according to claim 1, wherein the path comprises a multi-level path corresponding to multiple hierarchies in the probability process model.

6. The apparatus according to claim 1, wherein types of the differences comprise absent activities, and the determining module further comprises:
- a calculating module configured to calculate a universal set $S_{model}$ of paths of the leaf nodes in the probability process model, and a universal set $S_{log}$ of a path, of a leaf node aligned with a medical event in a medical event sequence of the at least one medical event sequence, in the probability process model, respectively;
- an absent activities obtaining module configured to calculate a difference set $S_{Absent}=S_{Log}-S_{Model}$ between the universal set $S_{Model}$ and the universal set $S_{Log}$ as absent activities.

7. The apparatus according to claim 1, wherein types of the differences comprise additional medical activities, and the determining module further comprises:
- a calculating module configured to calculate a universal set $S_{model}$ of paths of the leaf nodes in the probability process model, and a universal set $S_{Log}$ of a path, of a leaf node aligned with a medical event in a medical event sequence of the at least one medical event sequence, in the probability process model, respectively;
- an additional activities obtaining module configured to calculate a difference set $S_{Additional}=S_{Log}-S_{Model}$ between the universal set $S_{Log}$ and the universal set $S_{Model}$ as additional medical activities.

* * * * *